United States Patent [19]

Schaffer et al.

[11] Patent Number: 5,286,263

[45] Date of Patent: Feb. 15, 1994

[54] USE OF COPOLYMERS BASED ON LONG-CHAIN ALKYL VINYL ETHERS AND ETHYLENICALLY UNSATURATED DICARBOXYLIC ANHYDRIDES FOR RENDERING LEATHERS AND SKINS WATER-REPELLENT

[75] Inventors: Ortwin Schaffer, Ludwigshafen; Herbert Bay, Reuthlingen; Karl Stork, Carlsberg; Norbert Greif, Bobenheim; Knut Oppenlaender, Ludwigshafen; Walter Denzinger, Speyer; Heinrich Hartmann, Limburgerhof, all of Fed. Rep. of Germany

[73] Assignee: BASF Aktiengesellschaft, Ludwigshafen, Fed. Rep. of Germany

[21] Appl. No.: 829,062

[22] PCT Filed: Aug. 6, 1990

[86] PCT No.: PCT/EP90/01283

§ 371 Date: Feb. 10, 1992

§ 102(e) Date: Feb. 10, 1992

[87] PCT Pub. No.: WO91/02094

PCT Pub. Date: Feb. 21, 1991

[30] Foreign Application Priority Data

Aug. 8, 1989 [DE] Fed. Rep. of Germany ....... 3926168

[51] Int. Cl.$^5$ ............................................. C14C 3/08
[52] U.S. Cl. ..................................... 8/94.33; 252/8.57
[58] Field of Search ...................... 8/94.33, 94.1 R; 252/8.57, 8.75

[56] References Cited

U.S. PATENT DOCUMENTS

| 2,746,837 | 5/1956 | Kirk | 8/94.33 |
| 2,768,056 | 10/1956 | Kirk | 8/94.18 |
| 4,043,923 | 8/1977 | Loudas | 252/8.75 |
| 4,190,687 | 2/1980 | Sugiura et al. | 8/94.1 R X |

FOREIGN PATENT DOCUMENTS

| 0307815 | 3/1989 | European Pat. Off. |
| 2629748 | 12/1977 | Fed. Rep. of Germany |
| 3733172 | 4/1989 | Fed. Rep. of Germany |
| 1080447 | 12/1954 | France |
| 725671 | 3/1955 | United Kingdom |

*Primary Examiner*—Arthur C. Prescott
*Attorney, Agent, or Firm*—Oblon, Spivak, McClelland, Maier & Neustadt

[57] ABSTRACT

Copolymers which are obtainable by free radical copolymerization of (a) $C_8$–$C_{40}$-alkyl vinyl ethers, if necessary as a mixture with not more than 50 mol % of $C_8$–$C_{40}$-monoolefins, with (b) ethylenically unsaturated $C_4$–$C_8$-dicarboxylic anhydrides at from 80° to 300° C. to give copolymers having molecular weights of from 500 to 20,000 g/mol, subsequent solvolysis of the anhydride groups of the copolymers and partial or complete neutralization of the carboxyl groups formed during the solvolysis, in an aqueous medium by means of a base, and which are present in the form of aqueous dispersions or solutions, are used as agents for imparting water repellency to leathers and skins.

6 Claims, No Drawings

USE OF COPOLYMERS BASED ON LONG-CHAIN ALKYL VINYL ETHERS AND ETHYLENICALLY UNSATURATED DICARBOXYLIC ANHYDRIDES FOR RENDERING LEATHERS AND SKINS WATER-REPELLENT

German Laid-Open Application DOS 3,733,172 discloses fuels for carburetor-type engines which contain, inter alia, small amounts of copolymers of (a) $C_1$–$C_{30}$-alkyl vinyl ethers or mixtures of $C_1$–$C_{30}$-alkyl vinyl ethers and olefins of 2 to 40 carbon atoms and (b) maleic anhydride and have a molecular weight of from 500 to 20,000 g/mol and in which some or all of the anhydride groups of the copolymers have been reacted with aqueous alkali metal or alkaline earth metal bases and the remainder of the carboxyl groups have been converted with alcohols and/or amines into the corresponding ester and/or amide groups and/or ammonium salts.

German Patent 2,629,748 discloses the use of copolymers of $C_{10}$–$C_{30}$-olefins and maleic anhydride, which are hydrolyzed with alkali metal bases or amines, for filling and fatliquoring leathers and skins. The hydrolyzed copolymers can also be reacted with alkali metal bisulfites. Since the copolymers are prepared in organic solvents and the solvents are not removed, the aqueous copolymer dispersions prepared therefrom contain considerable amounts of organic solvents, for example xylene or dodecylbenzene. Although such dispersions are suitable for fatliquoring leathers and skins, owing to their content of organic solvents they are virtually useless for rendering leathers and skins water-repellent.

U.S. Pat. No. 2,746,837 discloses the treatment of hides, skins and leathers with lower alkyl vinyl ether/maleic anhydride copolymers in which not less than 5 and not more than 15% of the anhydride groups are present in the form of the semi-amide salts of ammonia and lower aliphatic primary and secondary amines. The treatment is carried out with the aid of aqueous solutions of the semi-amide salts of the stated copolymers.

U.S. Pat. No. 2,768,056 discloses a process for impregnating hides and skins at pH 2.5–4.0 with aqueous solutions of hydrolyzed and partially neutralized copolymers of methyl vinyl ether/maleic anhydride copolymers.

It is an object of the present invention to provide an improved agent for rendering leathers and skins water-repellent.

We have found that this object is achieved, according to the invention, by the use of copolymers which are obtainable by free radical copolymerization of (a) $C_8$–$C_{40}$-alkyl vinyl ethers or a mixture of $C_8$–$C_{30}$-alkyl vinyl ethers and not more than 50 mol % of $C_8$–$C_{40}$-monoolefins with (b) ethylenically unsaturated $C_4$–$C_6$-dicarboxylic anhydrides to give a copolymer having a molecular weight of from 500 to 20,000 g/mol, subsequent solvolysis of the anhydride groups of the copolymer and partial or complete neutralization of the carboxyl groups formed during the solvolysis, in an aqueous medium by means of a base, and which is present in the form of a 0.5–50% strength by weight aqueous dispersion, as an agent for rendering leathers and skins water-repellent.

The copolymers are disclosed in, for example, German Laid-Open Application DOS 3,733,172. They are prepared by copolymerization of the monomers of group (a) with the monomers of group (b), solvolysis of the anhydride groups of the copolymers and partial neutralization of the carboxyl groups resulting during the solvolysis. Suitable monomers of group (a) are $C_8$–$C_{40}$-alkyl vinyl ethers or mixtures of these alkyl vinyl ethers with $C_8$–$C_{40}$-monoolefins. The alkyl vinyl ethers include, for example, n-octyl vinyl ether, 2-ethylhexyl vinyl ether, 2,2,4-trimethylpentyl vinyl ether, n-decyl vinyl ether, dodecyl vinyl ether, isododecyl vinyl ether, n-tridecyl vinyl ether, isotridecyl vinyl ether, n-tetradecyl vinyl ether, n-hexadecyl vinyl ether, n-octadecyl vinyl ether, n-eicosyl vinyl ether, n-docosyl vinyl ether, n-tetracosyl vinyl ether, n-hexacosyl vinyl ether, n-octacosyl vinyl ether, oleyl vinyl ether, cyclooctyl vinyl ether and mixtures of the stated alkyl vinyl ethers.

Examples of suitable monoolefins of 8 to 40 carbon atoms are n-oct-1-ene, 2,4,4-trimethylpent-1-ene, 2,4,4-trimethylpent-2-ene, diisobutene, which is available industrially as an isomer mixture of about 80% by weight of 2,4,4-trimethylpent-1-ene and about 20% by weight of 2,4,4-trimethylpent-2-ene, 4,4-dimethylhex-1-ene, dec-1-ene, dodec-1-ene, tetradec-1-ene, hexadec-1-ene, octadec-1-ene, 1-($C_{20}$-olefins), 1-($C_{22}$-olefins), 1-($C_{24}$-olefins), 1-($C_{20}$–$C_{24}$-olefins), 1-($C_{24}$–$C_{28}$-olefins), 1-($C_{30}$-olefins), 1-($C_{35}$-olefins) and 1-($C_{40}$-olefins). The olefins or mixtures of olefins are commercial products. In addition to the straight-chain olefins, cyclic olefins, such as cyclooctene, are also suitable. The olefins may contain small amounts, for example not more than about 5% by weight, of inert hydrocarbons from the preparation. The olefins are usually used in the commercially available quality. They need not be subjected to any special purification. The preferred olefins are $C_{16}$–$C_{30}$-olefins. The stated olefins are used in the copolymerization as a mixture with the alkyl vinyl ethers, as monomers of group (a). The amount of olefins in the mixtures is not more than 50 mol %.

Suitable components (b) of the copolymers are monoethylenically unsaturated $C_4$–$C_8$-dicarboxylic anhydrides, e.g., maleic anhydride, itaconic anhydride, mesaconic anhydride, citraconic anhydride and methylenemalonic anhydride and mixtures thereof. Among the stated anhydrides, maleic anhydride is preferably used. The copolymers contain from 40 to 60 mol % of alkyl vinyl ethers and, if required, monoolefins and from 60 to 40 mol % of the stated dicarboxylic anhydrides as polymerized units and have a molecular weight of from 500 to 20,000, preferably from 800 to 10,000, g/mol. They are obtainable by polymerization of the monomers (a) and (b) in a molar ratio of from 1.1:1 to 1:1. The monomers (a) and (b) are preferably polymerized in a molar ratio of 1:1 or only a 1% by weight excess of monomers of component (a) is used. The monomers of groups (a) and (b) are known to form alternating copolymers which, in the case of high molecular weights, contain 50 mol % of monomers (a) and 50 mol % of monomers (b) as polymerized units. In the case of very low molecular weights of the copolymers, the molar ratio may differ from the abovementioned range, depending on the type of terminal groups, if, for example, the copolymer chain starts with the monomers (a) and also ends with the monomers (a).

The copolymers can be prepared by all known conventional polymerization methods, for example mass, suspension, precipitation and solution polymerization. The copolymerization is preferably carried out in the presence of free radical initiators. Not more than 10, preferably from 0.2 to 5,% by weight, based on the monomers used in the copolymerization, of the said initiators are required. All stated polymerization methods are carried out in the absence of oxygen, preferably in a stream of nitrogen. For all polymerization methods, the conventional apparatuses are used, for example autoclaves and kettles, which are equipped with, for example, anchor, paddle or impeller stirrers or multistage impulse countercurrent agitators. Mass polymerization of the monomers of groups (a) and (b) is particularly preferred. It is carried out at from 80° to 300° C., preferably from 120° to 200° C., the lowest polymerization temperature chosen preferably being at least about 20° C. above the glass transition temperature of the polymer formed. The polymerization conditions are chosen according to the desired molecular weight of the copolymers. Polymerization at high temperatures gives copolymers having low molecular weights whereas polymers having higher molecular weights are formed at lower polymerization temperatures. The amount of polymerization initiator also has an effect on the molecular weight. In general, from 0.01 to 5% by weight, based on the monomers used in the polymerization, of free radical polymerization initiators are required. Larger amounts of initiator lead to copolymers having lower molecular weights. At above 200° C., the monomers (a) and (b) can also be copolymerized in the absence of polymerization initiators, i.e., it is not absolutely essential to use initiators, because the monomers (a) and (b) undergo free radical polymerization also in the absence of initiators at above 200° C.

Examples of suitable polymerization initiators are acetylcyclohexanesulfonyl peroxide, diacetyl peroxydicarbonate, dicyclohexyl peroxydicarbonate, di-2-ethylhexyl peroxydicarbonate, tert-butyl perneodecanoate, 2,2'-azobis(4-methoxy-2,4-dimethylvaleronitrile), tert-butyl perpivalate, tert-butyl per-2-ethylhexanoate, tert-butyl permaleate, 2,2'-azobisisobutyronitrile, bis-(tert-butylperoxy)-cyclohexane, tert-butyl peroxyisopropylcarbonate, tert-butyl peracetate, di-tert-butyl peroxide, di-tert-amyl peroxide, cumene hydroperoxide and tert-butyl hydroperoxide. The initiators can be used alone or as a mixture with one another. In mass polymerization, they are preferably introduced into the polymerization reactor separately or in the form of a solution or dispersion in the monomer of component (a). In the copolymerization, it is of course also possible to use redox coinitiators, for example benzoin, dimethylaniline, ascorbic acid and complexes of heavy metals, such as copper, cobalt, iron, manganese, nickel and chromium, which complexes are soluble in organic solvents. The presence of redox coinitiators permits the polymerization to be carried out at lower temperatures. The amounts of redox coinitiators usually used are about 0.1-2000 ppm, preferably 0.1-1000 ppm, based on the amounts of monomers used. If the monomer mixture is initially polymerized at the lower limit of the temperature range suitable for the polymerization and then completely polymerized at a higher temperature, it is advantageous to use two or more different initiators which decompose at different temperatures, so that a sufficient concentration of free radicals is available within each temperature range.

In order to prepare low molecular weight polymers, it is often advantageous to carry out the copolymerization in the presence of regulators. Conventional regulators may be used for this purpose, for example $C_1$–$C_4$-aldehydes, formic acid and compounds containing organic SH groups, such as 2-mercaptoethanol, 2-mercaptopropanol, mercaptoacetic acid, mercaptopropionic acid, tert-butyl mercaptan, n-dodecyl mercaptan and tert-dodecyl mercaptan.

Polymerization regulators are generally used in amounts of from 0.1 to 10% by weight, based on the monomers.

The copolymerization is carried out in conventional polymerization apparatuses, for example a pressure-resistant kettle which is provided with a stirrer, in pressure-resistant stirred kettle cascades or in a tubular reactor. The (a) alkyl vinyl ethers and, where relevant, the mixtures of alkyl vinyl ethers and olefins and the (b) anhydrides are copolymerized using an equimolar ratio of (a):(b). The copolymerization can be carried out continuously or batchwise.

For example, one or more alkyl vinyl ethers or a mixture of alkyl vinyl ethers and one or more olefins may be initially taken in the reactor and heated to the desired polymerization temperature while stirring. As soon as the monomers initially taken in the reactor have reached the desired polymerization temperature, the ethylenically unsaturated dicarboxylic anhydride is metered in. If an initiator is used, it is metered into the reaction mixture preferably separately or in solution in an alkyl vinyl ether used for the polymerization or in a mixture of alkyl vinyl ether and olefin. Where it is used, the polymerization regulator is added to the polymerization mixture either separately or likewise in solution in a monomer of component (a). The ethylenically unsaturated carboxylic anhydrides, in particular maleic anhydride, are preferably added in the form of a melt to the reaction mixture. The temperature of the melt of the maleic anhydride is about 70°-90° C. If, in the copolymerization, the monomers of component (a) are used in excess, for example in a 10% excess, they can be removed from the reaction mixture without difficulties after the end of the copolymerization, by means of distillation, preferably under reduced pressure, from the copolymer melt. The copolymer melt is then advantageously directly further processed.

The monomers of groups (a) and (b) can of course also be prepared by a type of precipitation and suspension polymerization.

In the precipitation polymerization, the solvents used are those in which the monomers, i.e., vinyl ethers and, where relevant, olefins and maleic anhydride, are soluble and the copolymer formed is insoluble and is precipitated. Examples of such solvents are aromatic hydrocarbons, such as benzene, toluene, o-xylene, m-xylene, p-xylene and the industrial xylene mixtures, ethylbenzene and cumene, and halohydrocarbons, such as methylene chloride, 1,1- and 1,2-dichloroethane, 1,1,1-trichloroethane, 1,1,2-trichloroethylene, 1,1,2-trichloroethane, perchloroethylene, 1,2-dichloropropane, butyl chloride, 1,1,2-trichloro-1,2,2-trifluoroethane, 1,1,1,2-tetrachloro-2,2-difluoroethane and 1,1,2,2-tetrachloro-1,2-difluoroethane, and ethers, such as diethyl ether, dipropyl ether, dibutyl ether, methyl tert-butyl ether, diethylene glycol dimethyl ether and mixtures thereof.

In the suspension polymerization, the solvents used are those in which all or at least one of the monomers and the polymers formed are insoluble. Straight-chain and branched aliphatic and cycloaliphatic hydrocarbons are suitable for this purpose. For example, pentane, hexane, heptane, octane, isooctane, cyclohexane, methylcyclohexane, ethylcyclohexane, dimethylcyclohexane, diethylcyclohexane and mixtures thereof are preferred. In carrying out the precipitation polymerization, it is advantageous, especially if the concentrations of monomers or copolymer are more than 40% by weight, to carry out the procedure in the presence of a protective colloid in order to prevent aggregate formation. It is essential to carry out the suspension polymerization in the presence of protective colloids in order to prevent undesirable agglomerations of the resulting polymers.

Suitable protective colloids are polymeric substances which are readily soluble in solvents and do not react with the monomers. Examples of suitable substances are copolymers of maleic anhydride with $C_{12}$–$C_{30}$-vinyl alkyl ethers and/or olefins of 8 to 20 carbon atoms and preferably their monoesters with $C_{10}$–$C_{20}$-alcohols or mono- or diamides with $C_{10}$–$C_{20}$-alkylamines and polyalkyl vinyl ethers where alkyl is of 1 to 20 carbon atoms, for example polymethyl, polyethyl, polyisobutyl and polyoctadecyl vinyl ether. The added amounts of protective colloid are usually from 0.05 to 4, preferably from 0.1 to 2,% by weight (calculated as monomers used), and it is often advantageous to combine several protective colloids.

In the polymerization, it is advantageous initially to take the solvent, the protective colloid and a monomer in the reactor and to meter in the comonomer and the initiator and, if required, the coinitiator and regulator at the selected polymerization temperature with thorough stirring. It is generally unimportant whether the maleic anhydride is initially taken and the alkyl vinyl ethers and, where relevant, the olefins are metered in or whether the alkyl vinyl ethers and, where relevant, the olefins are initially taken and the maleic anhydride is metered in. It is of course also possible initially to take only the solvent and the protective colloid and to meter in the monomers, i.e., alkyl vinyl ethers and, where relevant, olefin and maleic anhydride, together. The feed times for monomer and initiator are in general from 1 to 10, preferably from 2 to 5, hours. It is also possible to polymerize all starting materials together in a reactor, but problems with removal of heat may occur, so that such a procedure is not so advantageous. The concentrations of the monomers to be polymerized are from 20 to 80, preferably from 30 to 70,% by weight. The polymers can be isolated from the polymer suspensions directly in evaporators, for example belt driers, paddle driers, spray driers and fluidized-bed driers. Precipitation polymerization and suspension polymerization are particularly suitable for the preparation of copolymers of maleic anhydride, alkyl vinyl ethers and olefins of 8 to 12 carbon atoms. If relatively long-chain alkyl vinyl ethers and, if required, olefins are used, the copolymers formed may be soluble in the stated solvents, so that the polymerization should be regarded as a solution polymerization.

Solution polymerization is carried out in solvents in which the monomers and the copolymers formed are soluble. Suitable solvents for this purpose are all those which meet this specification and do not react with the monomers. Examples are acetone, methyl ethyl ketone, diethyl ketone, methyl isobutyl ketone, ethyl acetate, butyl acetate, tetrahydrofuran and dioxane, the two last-mentioned ones being particularly suitable for obtaining low molecular weight copolymers. As in the case of mass, suspension and precipitation polymerization, it is also advantageous here initially to take the solvent and a monomer component and to meter in the second component with the initiator and, if required, the coinitiator and regulator. The solvents and maleic anhydride may be initially taken in the polymerization reactor and, after the polymerization temperature has been reached, the alkyl vinyl ether and, if required, the olefin and the initiator and any coinitiator and regulator may then be metered in. However, it is more advantageous initially to take the solvent and the alkyl vinyl ether and, if required, the olefin and to meter in the maleic anhydride and the initiator and any coinitiator and regulator at the desired polymerization temperature. This procedure gives polymer solutions having less color. The concentrations of the monomers to be polymerized are from 20 to 80, preferably from 30 to 70,% by weight. The solid copolymer can readily be isolated by evaporating the solvent. In this case too, however, it is advantageous to select a solvent in which the further reaction to give the ammonium, alkali metal or alkaline earth metal salt and with alcohols and/or ammonia or amines can be carried out.

The copolymers obtained in the first process stage from alkyl vinyl ethers and, if required, olefins and maleic anhydride or the other suitable ethylenically unsaturated carboxylic anhydrides are then partially or completely converted into the ammonium, alkali metal or alkaline earth metal salts and, if conversion to the said salts has been only partial, are, if required, reacted with alcohols and/or amines to give the esters and/or amides and/or ammonium salts. However, it is also possible to carry out the subsequent reaction of the copolymers in the opposite order by first subjecting the copolymers to solvolysis with amines, ammonia and/or alcohols to give the corresponding esters and/or amides and/or ammonium salts and then converting the products into the salts, for example into the alkali metal or alkaline earth metal salts.

The copolymers prepared by the polymerization methods described above are subjected to solvolysis after cooling to room temperature or preferably in the form of a melt which is from 80° to 180° C., preferably from 90° to 150° C. Solvolysis of the anhydride groups of the copolymers consist in the simplest case in hydrolysis and subsequent neutralization. It is particularly advantageous to carry out the procedure in pressure-resistant apparatuses and to convert the anhydride groups into carboxyl groups therein directly by the addition of water to a melt of the copolymers obtainable in the mass polymerization, and to neutralize not less than 10% of the carboxyl groups of the hydrolyzed copolymers by subsequent addition of a base. Hydrolysis and neutralization can, however, also be carried out virtually simultaneously by the addition of a dilute aqueous base to the copolymer melt. The amounts of water and neutralizing agent are chosen to give solutions or dispersions which have a solids content of from 10 to 60, preferably from 20 to 55,% by weight and are made commercially available. These are then converted into preparation solutions by dilution to solids contents of from 0.5 to 50% by weight.

The copolymers obtainable by polymerization of the monomers (a) and (b) can also be subjected to solvolysis by the addition of primary and/or secondary amines. Solvolysis is carried out using amounts of amines such that from 10 to 50% of the total amount of carboxyl groups formed from the polymerized monomers (b) in the event of complete hydrolysis undergo amidation. After the formation of the semi-amide groups in the copolymer, neutralization is carried out. It is continued until not less than 10% of the carboxyl groups of the copolymer obtained in the mass polymerization are neutralized.

Furthermore, solvolysis may also be carried out using aminocarboxylic acids and salts of aminocarboxylic acids, preferably the alkali metal salts. Alkali metal salts of α-aminocarboxylic acids are particularly preferably used, the alkali metal salts of sarcosine being very particularly advantageous. Solvolysis by means of salts of aminocarboxylic acids is advantageously carried out in an aqueous medium. Solvolysis is effected using amounts of aminocarboxylates such that from 10 to 50% of the total amount of carboxyl groups formed from the polymerized monomers (b) in the event of complete hydrolysis undergo amidation. After the formation of the semi-amide groups in the copolymer, neutralization is carried out. It is continued until not less than 10% of the carboxyl groups of the copolymer obtained in the mass polymerization are neutralized.

Solvolysis can also be carried out by adding alcohols to a melt of the copolymers obtainable by mass polymerization. The amounts of alcohol used are such that from 10 to 50% of the total amount of carboxyl groups formed from the polymerized dicarboxylic acid units are esterified. Neutralization is subsequently effected, in which not less than 10% of the total amount of carboxyl groups formed from the anhydride-containing copolymer are neutralized.

Preferably, in each case from 20 to 50% of the total amount of carboxyl groups formed from the polymerized dicarboxylic anhydrides undergo amidation or esterification. Examples of suitable neutralizing agents are ammonia, amines, alkali metal and alkaline earth metal bases, for example sodium hydroxide solution, potassium hydroxide solution, sodium bicarbonate, sodium carbonate, potassium carbonate, magnesium hydroxide, calcium hydroxide, barium hydroxide and all amines which are also used for amidation of the copolymers. Neutralization is preferably effected by adding aqueous sodium hydroxide solution to the copolymer. The neutralization of the anhydride-containing copolymers is carried out at least to a degree such that water-dispersible copolymers are obtained. This degree of neutralization is not less than 10% of the total amount of carboxyl groups formed from the anhydride groups. The degree of neutralization is furthermore dependent on the chain length of the particular alkyl vinyl ether and/or olefin of component (a) used. In order to obtain copolymers which are readily water dispersible or soluble to give a colloidal solution, for example, a copolymer obtained from a $C_{30}$-alkyl vinyl ether and maleic anhydride is subjected to not less than 75% neutralization, whereas, for example, a copolymer obtained from a $C_{20}$-alkyl vinyl ether and maleic anhydride is readily dispersible in water when the degree of neutralization corresponds to 50% of the carboxyl groups formed from this copolymer. In a copolymer obtained from a $C_{12}$-alkyl vinyl ether and maleic anhydride, a degree of neutralization of only 20% of the carboxyl groups formed from the polymerized maleic anhydride is sufficient for dispersing the copolymer in water.

For amide formation, ammonia and primary and secondary amines may be used. Amide formation is preferably effected in the absence of water by reaction of the anhydride groups of the copolymer with ammonia or amines. The suitable primary and secondary amines may contain 1 to 40, preferably 3 to 30, carbon atoms. Examples of suitable amines are methylamine, ethylamine, n-propylamine, isopropylamine, n-butylamine, isobutylamine, hexylamine, cyclohexylamine, methylcyclohexylamine, 2-ethylcyclohexylamine, n-octylamine, isotridecylamine, tallow fatty amine, stearylamine, oleylamine, dimethylamine, diethylamine, di-n-propylamine, diisopropylamine, di-n-butylamine, diisobutylamine, dihexylamine, dicyclohexylamine, dimethylcyclohexylamine, di-2-ethylhexylamine, di-n-octylamine, diisotridecylamine, di-tallow fatty amine, distearylamine, dioleylamine, ethanolamine, diethanolamine, n-propanolamine, di-n-propanolamine and morpholine. Morpholine is preferably used.

In order to effect partial esterification of the anhydride-containing copolymers obtained in the polymerization, the said polymers are reacted with alcohols. The esterification is also preferably carried out in the absence of water. Suitable alcohols may contain 1 to 40, preferably 3 to 30, carbon atoms. Primary, secondary and tertiary alcohols may be used. Both saturated aliphatic alcohols and unsaturated alcohols, for example oleyl alcohol, may be employed. Monhydric, primary or secondary alcohols are preferably used, for example methanol, ethanol, n-propanol, isopropanol, n-butanol, isobutanol, n-pentanol and isomers, n-hexanol and isomers, n-octanol and isomers, such as 2-ethylhexanol, nonanols, decanols, dodecanols, tridecanols, cyclohexanol, tallow fatty alcohol, stearyl alcohol and the alcohols and alcohol mixtures of 9 to 19 carbon atoms which are readily obtainable industrially by the oxo process, for example $C_{9/11}$ oxo alcohol, $C_{13/15}$ oxo alcohol and Ziegler alcohols of 12 to 24 carbon atoms, which are known under the name Alfol. Alcohols of 4 to 24 carbon atoms, e.g., n-butanol, isobutanol, amyl alcohol, 2-ethylhexanol, tridecanol, tallow fatty alcohol, stearyl alcohol, $C_{9/11}$ oxo alcohol, $C_{13/15}$ oxo alcohol, $C_{12/14}$ Alfols and $C_{16/18}$ Alfols, are preferably used.

After the partial conversion of the anhydride groups into semi-amide or half-ester groups, hydrolysis of the remaining anhydride groups of the copolymer is carried out. The hydrolysis of the remaining anhydride groups of the copolymer may also be carried out simultaneously with the partial neutralization still required, by adding an aqueous base to the partially amidated or esterified copolymer still containing anhydride groups. The amount of water and bases is chosen so that the concentration of the copolymer dispersion or solution is preferably from 20 to 55% by weight. The pH of the ready-to-use agent for imparting water-repellency is about 4–10.

The aqueous copolymer dispersions thus obtainable are stable and have a long shelf life. They are very suitable for finishing leathers and skins because they have a particularly pronounced action in imparting water-repellency and moreover have a fatliquoring and retanning action. The leather and skin material treated with these copolymer dispersions exhibits only little water absorptivity and water permeability. The dispersions simultaneously act as plasticizers, so that in most cases no additional fatliquoring agents based on natural or synthetic fatliquoring oils are required. The dispersions impart to the product good body and high tensile strength and tear strength, so that additional treatment with commercial retanning agents, for example with vegetable tanning agents or synthetic organic tanning agents (synthanes) based on phenolsulfonic acid/phenol/formaldehyde condensates, is no longer necessary in most cases.

Another advantage of the aqueous dispersions to be used according to the invention is that they contain no additional emulsifiers. It is known that leathers and skins which have been treated with emulsifier-containing products must, after treatment with these agents, be subjected to expensive processes, for example aftertreatment with polyvalent metal salts, in order to deactivate the emulsifiers in the leather or in the skins.

The copolymer dispersions or copolymer solutions described above are suitable for the treatment of all conventional tanned hides, in particular hides tanned with mineral tanning agents, such as chromium(III) salts. The tanned hides are usually neutralized before the treatment. They may be dyed before the treatment. However, dyeing may also be carried out after the water-repellent treatment effected according to the invention.

The tanned hides are treated with the aqueous dispersions advantageously in an aqueous liquor obtainable by diluting the copolymer dispersions with water, at a pH of from 4 to 10, preferably from 5 to 8, and at from 20° to 60° C., preferably from 30° to 50° C., for from 0.1 to 5, in particular from 0.5 to 2, hours. This treatment is effected, for example, by drumming. The required amount of copolymer dispersion or solution is from 0.1 to 30, preferably from 1 to 20,% by weight, based on the shaved weight of the leather or the wet weight of the skin. The liquor length, i.e., the percentage weight ratio of treatment liquor to goods, based on the shaved weight of the leather or the wet weight of the skin, is usually from 10 to 1000%, preferably from 30 to 150%, or from 50 to 500% in the case of skins.

After the treatment with the aqueous liquor described above, the pH of the treatment liquor is brought to 3–5, preferably 3.5–4, by the addition of an acid; organic acids, such as formic acid, are preferably used.

When conventional retanning agents are present during finishing of the leather and of the skin, the treatment with the aqueous dispersions or solutions to be used according to the invention can be carried out before or after the retanning step or as a multistage process, the aqueous dispersions or solutions being used proportionately before, during and after the retanning step. The aqueous dispersions or solutions to be used as water-repellents may also be employed together with conventional leather and skin finishing agents, such as paraffin-based water-repellent fatliquors. In some cases, this improves the water-repellent, fatliquoring and retanning effect.

In the Examples, percentages are by weight, unless stated otherwise. The molecular weights of the copolymers were determined by gel permeation chromatography, tetrahydrofuran being used as the eluent and polystyrene fractions having a narrow distribution being used for calibration. The treated leathers were tested for water absorptivity and water permeability using a Bally penetrometer according to measurement method IUP 10 of the International Union of the Leather Chemists Associations, Commissions for Physical Leather Testing, cf. das Leder, 12 (1961), 36–40.

PREPARATION OF AQUEOUS COPOLYMER DISPERSIONS

Dispersion 1

In a stainless steel reactor equipped with a stirrer, feed apparatuses and an apparatus for working up under nitrogen, 299 g (1.01 mol) of n-octadecyl vinyl ether were heated to 160° C. with constant stirring in a gentle stream of nitrogen. As soon as this temperature had been reached, 98 g (1 mol) of liquid maleic anhydride was added in the course of 3 hours and, separately from this, 9 g of di-tert-butyl peroxide were introduced uniformly. The polymerization temperature was kept in the range from 155° to 160° C. After the end of the addition of maleic anhydride and peroxide, the reaction mixture was heated for a further 2 hours at 160° C. with constant stirring and was then cooled to 120° C. The reactor was sealed pressure-tight and the copolymer melt was subjected to solvolysis at 120° C. under superatmospheric pressure by simultaneously metering into the melt, in the course of 1 hour, at the stated temperature, 80 g of 50% strength aqueous sodium hydroxide solution (1 mol) and 972 g of water heated to 90° C., with thorough stirring (about 400 rpm). The reaction mixture was stirred for a further 2 hours at 120° C. and then cooled. A slightly viscous dispersion having a solids content of 30.4% was obtained. The molecular weight of the copolymer before neutralization was 4500 g per mol.

Polymer dispersion II

In the reactor described above, 236.8 g (0.8 mol) of n-octadecyl vinyl ether and 51 g (0.202 mol) of n-octadec-1-ene were initially taken and were heated to 170° C. in a gentle stream of nitrogen. As soon as the temperature of 170° C. had been reached, 98 g (1 mol) of liquid maleic anhydride were added in the course of 4 hours with constant stirring and, separately from this, 12 g of di-tert-butyl peroxide in liquid form were introduced uniformly. Thereafter, the reaction mixture was stirred for a further 2 hours at 170° C. and cooled to 120° C. At this temperature, 87 g (1 mol) of morpholine were added in the course of half an hour and the mixture was heated at 120° C. for a further 2 hours. It was then cooled to 95° C., and 80 g of 50% strength aqueous sodium hydroxide solution (1 mol) and 1365 g of water which had been heated to 90° C. were added simultaneously in the course of 1 hour. The reaction mixture was stirred for a further 2 hours at from 90° to 95° C. and then cooled. The aqueous dispersion, which was slightly viscous at room temperature, had a solids content of 25.8%. The molecular weight of the copolymer before the addition of morpholine was 3900 g per mol.

EXAMPLE 1

Chrome-tanned ox leather which had a shaved thickness of 1.8 mm and had been brought to a pH of 5.0 was drummed for 2 hours at 40° C. with 15%, based on shaved weight, of dispersion I. The total liquor length was 100%.

Thereafter, the leather was retanned with 2% by weight of mimosa extract and dyed with 1% by weight of a commercial anionic aniline dye. The leather was then brought to a pH of 3.7 with formic acid, after which it was washed, mechanically set out and dried.

The leather obtained had a full, soft hand, was uniformly dyed and exhibited very good dynamic water resistance. The test using the Bally penetrometer gave a value of 21.2% for the water absorption after 24 hours at 15% compression and did not indicate any water permeability during this time.

EXAMPLE 2

Chrome-tanned ox leather which had a shaved thickness of 1.8 mm and had been brought to a pH of 5.0 was drummed for 2 hours at 40° C. with 20% of dispersion II and at the same time with 5% of a 42% strength aqueous dispersion of a commercial paraffin-based water-repellent fatliquor, the percentages in each case being based on the shaved weight of the leather. The total liquor length was 150%. After this treatment, the leather was brought to a pH of 3.8 with formic acid and was finished in a conventional manner.

The leather obtained had an extremely soft and pleasant hand and exhibited high water resistance. The test with the Bally penetrometer gave a value of 17.1% for the water absorption after 24 hours at 15% compression and did not indicate any water permeability during this time.

We claim:

1. A process for rendering leathers and skins water-repellent, which comprises using a copolymer which is obtainable by free radical copolymeriztion of
   (a) $C_8$–$C_{40}$-alkyl vinyl ethers or a mixture of $C_8$–$C_{40}$-alkyl vinyl ethers and not more than 50 mol % of $C_8$–$C_{40}$-monoolefins with
   (b) ethylenically unsaturated $C_4$–$C_8$-dicarboxylic anhydrides to give a copolymer having a molecular weight of from 500 to 20,000 g/mol, subsequent solvolysis of the anhydride groups of the copolymer and partial or complete neutralization of the carboxyl groups formed during the colvolysis, in an aqueous medium by means of a base, and which is present in the form of an aqueous solution or dispersion.

2. A process as claimed in claim 1, wherein the anhydride-containing copolymer is obtainable by mass polymerization of the monomers (a) and (b) at from 80° to 300° C., and the resulting melt of the copolymer is subjected to solvolysis and partially neutralized.

3. A process as claimed in claim 1, wherein the solvolysis is carried out by adding water to the copolymer obtainable in the polymerization, and not less than 10% of the carboxyl groups of the hydrolyzed copolymer are neutralized with ammonia, an amine or an alkali metal or alkaline earth metal base.

4. A process as claimed in claim 1, wherein the solvolysis is carried out by adding primary or secondary amines or a mixture thereof to the copolymer obtainable in the polymerization, in such a way that from 10 to 50% of the total amount of carboxyl groups formed from the polymerized monomers (b) undergo amidation and not less than 10% of the total amount of carboxyl groups formed are neutralized.

5. A process as claimed in claim 1, wherein the solvolysis is carried out by adding an alcohol to the copolymer obtainable in the polymerization, in such a way that from 10 to 50% of the total amount of carboxyl groups formed from the polymerized monomers (b) are esterified and not less than 10% of the total amount of carboxyl groups formed are neutralized.

6. A process as claimed in claim 1, wherein the solvolysis is carried out in an aqueous medium by adding a salt of an aminocarboxylic acid, in such a way that from 10 to 50% of the total amount of carboxyl groups formed from the polymerized monomers (b) undergo amidation and not less than 10% of the total amount of carboxyl groups formed are neutralized.

* * * * *